Jan. 14, 1964     H. L. BOWEN     3,117,378
SURVEYING APPARATUS
Filed Nov. 9, 1960     2 Sheets-Sheet 2
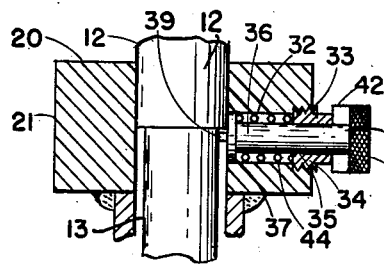
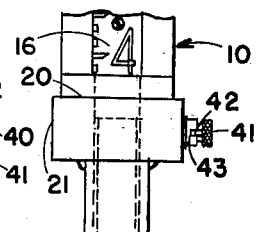
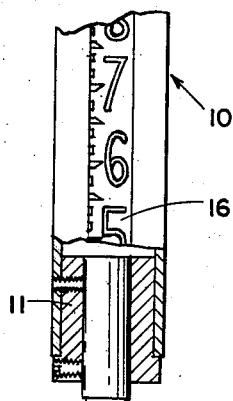
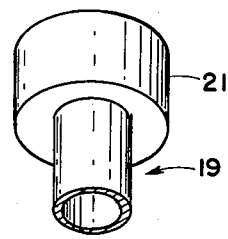
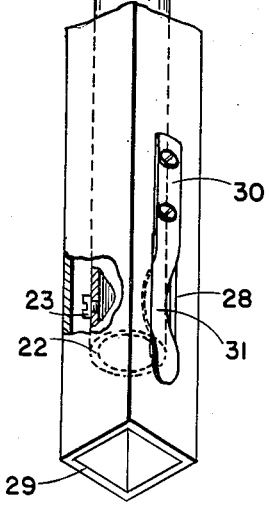
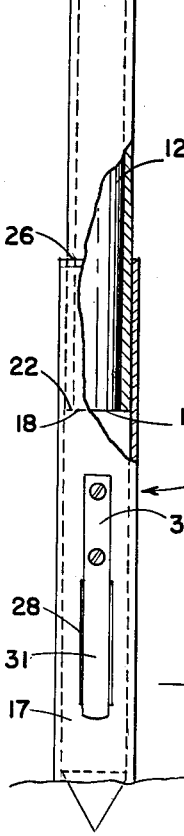
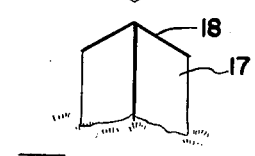
INVENTOR.
HERMAN L. BOWEN
BY
J. F. Cuneo
ATTORNEY 3,117,378
        SURVEYING APPARATUS
Herman L. Bowen, 12103 Morning Ave., Downey, Calif.
       Filed Nov. 9, 1960, Ser. No. 68,224
            8 Claims. (Cl. 33—74)

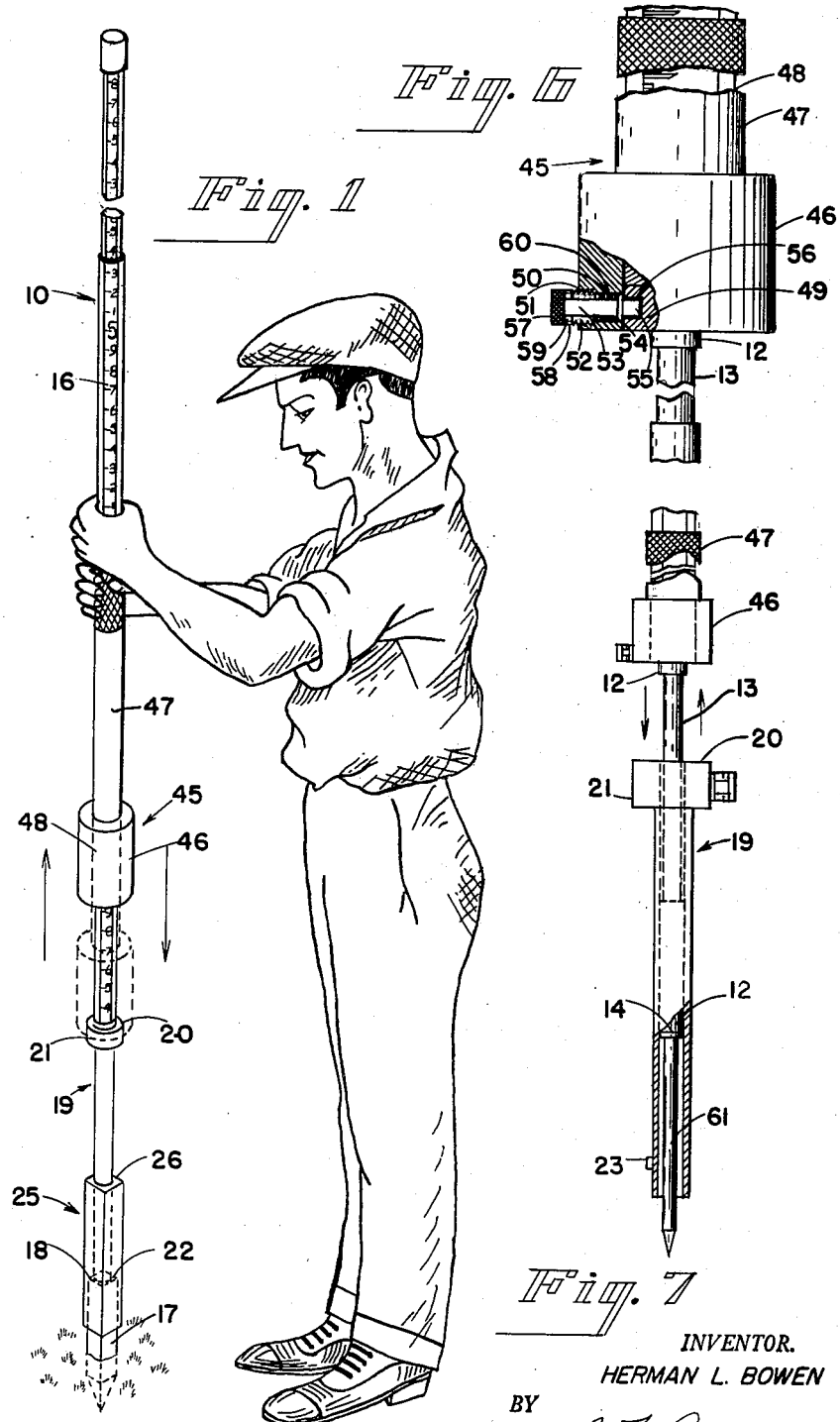

This invention relates to surveying instruments of the class of level rods, and in particular to a level rod and stake driving combination in which the zero point of the level rod is in contact with the top of the stake or pin while it is being driven, permitting an operator to take a reading at any time.

Conventional level rods of the Philadelphia type are normally placed in contact with the stake or pin only when the height of the stake is to be ascertained. Whenever the stake is to be driven deeper into the ground, the rodman must remove the level rod and the head of the stake or pin subjected to strokes from a hammer or equivalent tool. The height of the stake or pin is determined from time to time by taking a reading when the level rod is in contact with the upper end of the stake or pin. This operation is repeated until the head of the marker is at the correct elevation. If the stake has been driven too far into the ground, it must be pulled out and reset to the proper height. Such operations are time consuming and create needless work. Also, in the conventional method of locating stakes and the like it is virtually impossible to drive a stake below the surface of the ground and accurately determine its elevation without previously excavating the ground.

A purpose of this invention is to provide a compact level rod and stake driving combination which permits the zero reference point of the level rod to be continuously in contact with the upper end of the stake or pin, both while the readings are being taken and while the stake or pin is being driven; this permits the transitman or levelman to take continuous readings if he so desires.

Another purpose of this invention is to provide a level rod-stake driving combination that makes it possible to drive the head of a stake or pin below the surface of the ground and still give an accurate reading of its elevation without the necessity of removing the rod from contact with the stake and excavating for that purpose.

A further purpose of this invention is to make available a level rod and stake driving combination wherein a stake is placed in contact with the zero point of the indicia before the stake is driven and remains in contact with it while it is being driven, the arrangement facilitates the starting of the stake into the ground and also guides it while maintaining the proper angle.

An additional purpose of this invention is to provide a combination of the type indicated that incorporates a hammer means as a part of the combination that is capable of supplying the impact needed for driving stakes thus eliminating accessory equipment, the end of the projection or zero end remains in contact with the head of the stake at all times.

I accomplish all of these desirable purposes by means of my novel level rod and stake driving combination. The level rod may be of any conventional type, the one shown in the drawings is the Philadelphia type of rod. The numberings on the face of the novel level rod commence at a number above zero and below the lowest number there extends from the level rod a projection. The end of this projection is located to correspond to the zero point of the indicia on the rod. The exact elevation of the head of the stake on which the end of the projection rests can be read by the transit or level operator at any time. The projection is provided with a portion having a smaller cross sectional area than the remainder of the projection. The portion having a reduced cross section is made of suitable length and has its upper shoulder near the point where the projection starts from the level rod proper.

An anvil sleeve having an anvil at one end is slidably mounted on the projection. The anvil sleeve is generally provided with suitable means for engaging and disengaging the portion of reduced cross section of the projection and this means also permits the anvil sleeve to be held in sliding relationship with the projection without becoming separated from it and allows relative movement corresponding to the length of the portion of reduced cross section. When the means is in its disengaged position the anvil sleeve can be separated from the projection if desired.

A stake holder sleeve, open at its lower end, is preferably designed to conform to the geometrical outline of a stake that is to be inserted in the sleeve. The other end of the stake holder sleeve is closed and provided with an axial passageway large enough to permit the stake holder sleeve to slide on the outer surface of the anvil sleeve. The lower end of the anvil sleeve may be equipped with a suitable stop to prevent the stake holder sleeve from becoming separated from the anvil sleeve. The stake holder sleeve may also be provided with means capable of exerting pressure on one side of the stake, to prevent it from falling out of the holder when it is held in a vertical position. The pressure exerting means also serves to hold stake holder sleeve retracted when it is not being used as a stake holder, by exerting pressure on the outer surface of the anvil sleeve.

The impact for driving stakes is supplied by a hammer means comprising a head and handle, preferably in longitudinal alignment. Both the head and handle are provided with a longitudinal passageway, preferably axial, adapted to conform to the cross sectional shape of the level rod and large enough to permit the hammer means to slide freely on the level rod. The head of the hammer is adapted to strike the anvil and any impact thereon is transmitted to the head of the stake by the opposite end of the anvil sleeve.

The preceding and following detailed description of my invention can be better understood by reference to the drawings in which:

FIGURE 1 is a perspective view of the assembled apparatus showing the manner in which the operator would use it.

FIGURE 2 is a broken view, partly in cross section showing the lower end of a level rod and projection, the end of the projection which is also the zero point of the indicia, is shown to be resting on the planar end of a stake that has been partly driven into the ground.

FIGURE 3 is a plan view, partly cut away, showing the anvil sleeve with its anvil head, a stake holder sleeve at its lower end, both anvil sleeve and stake holder sleeve are mounted on the projection shown in FIGURE 2 in their operating position. A stake is included in the stake holder sleeve.

FIGURE 4 is a broken, isometric view of an anvil sleeve and stake holder sleeve, including a portion of a stake, prior to it being mounted on the level rod projection.

FIGURE 5 is a cross section view of a form of means for engaging and disengaging an anvil sleeve to the portion of reduced cross section in the level rod projection shown in FIGURE 2.

FIGURE 6 is a plan view, partly in cross section, of the sleevelike hammer means and includes a means for securing the hammer to the lower end of the level rod proper, when it is not to be used and it is not desirable to have it slide on the level rod.

FIGURE 7 is a plan view showing the manner in which the invention may be used to drive metal pins.

Referring to the drawings, FIGURE 2 includes the lower end portion of a Philadelphia rod 10. At the lower end of the numbered portion of the rod there is fitted an insert 11 from which there extends downwardly a projection 12 having a portion of reduced cross section 13 that is smaller than the remainder of projection 12. In the drawings the level rod, insert, and projection are shown as being circular in cross section for convenience of illustration, however, it is to be understood that any other suitable cross section could be employed if desired. Likewise projection 12 is shown to be considerably smaller in cross section than level rod 10 portion of reduced cross section 13 may be any desired length, but as shown in the drawings is preferably between 6″ and 8″ in length. The portion of reduced cross section begins with its upper shoulder a short distance below the end of the level rod proper. End 14 of projection 12 is normal to the longitudinal axis of the projection and is located to correspond to the zero position of the numbered scale 16 that is usually secured to the side of the level rod and directed to face the transit or level operator. Since end 14 is always in contact with the upper planar end 18 of stake 17, or equivalent elevation marker such as a pin, while it is being driven, the instrument operator can continuously follow the elevation of the end of the marker.

An anvil sleeve 19 has a longitudinal passageway corresponding in cross section to the cross section of projection 12, and fits projection 12 loosely enough to permit anvil sleeve 19 to slide freely on projection 12. Upper end 20 of anvil sleeve 19 is shaped in the form of an annular anvil. The anvil is shown to be annular for convenience and is shown to be larger in diameter than the remainder of the anvil sleeve and also larger than the level rod 10.

Normally lower planar end 22 of anvil sleeve 19 will rest against the upper planar surface 18 of stake 17 and will transmit any impact striking the anvil surface 20. Near end 22 of anvil sleeve 19 there is provided a suitable stake holder sleeve stop 23 which is secured to sleeve 19. Stop 23 is preferably a cylindrical headed bolt which can be removed by unscrewing it from sleeve 19.

Stake holder sleeve 25 is left open at its lower end and forms an internal chamber that is capable of receiving stake 17. Upper end 26 is closed and has an axial orifice adapted to permit stake holder sleeve 25 to slide freely but snugly on the lower portion of anvil sleeve 19. The drawings show the stake and the stake holder sleeve as being square in cross section, this is simply because the majority of stakes are generally square, however, if stakes of other cross section are employed the receptacle could be modified accordingly.

Stake holder sleeve 25 is provided with a rectangular opening 28 that extends through a side wall and begins at a position a distance above open end 29 and continues toward restricted end 26 a suitable distance. A curved, leaf type spring 30 is secured at one end above opening 28, to the side of stake holder sleeve 25 so that the concave portion 31 of the curved spring enters into the chamber adapted to receive a stake. When a stake is introduced into the chamber of the stake holder sleeve the curved portion of the spring will bear against the side of the stake and will hold the stake securely in the chamber. When the stake holder sleeve is not in use, it can be pushed upwardly on anvil sleeve 19 so the curved portion of the spring will be in contact with the outer surface of sleeve 19 thereby preventing the stake holder sleeve from dropping.

Anvil sleeve 19 is provided with suitable means that permit the anvil sleeve to become slidably engaged to reduced portion 13. When the engaging means is in cooperating position with reduced portion 13 it will permit the anvil sleeve to slide along projection 12 a distance equivalent to the length of reduced portion 13. When the means is disengaged from reduced portion 13 the anvil sleeve can be slipped off of projection 12. FIGURE 5 shows one embodiment by way of example of such an engaging-disengaging means. The engaging-disengaging means is located in the anvil portion 21. A radial bore 32 extends through the annular wall of anvil 21, the outer end 33 of bore 32 being threaded and is adapted to receive a sleeve nut 34 which has an axial bore 35. A pintle 36 fits slidably into axial bore 35 and the inner end of pintle 36 supports an enlarged flange 37 adapted to snugly slide in bore 32. The flat surface of flange 37 is provided with an engagement projection 39 that extends axially from flange 37 a short distance and is adapted to engage reduced portion 13. The other end 40 of pintle 36 is furnished with a head 41 having ears 42 adapted to seat in diametrically positioned notches 43, FIGURE 3, cut in the outer end of sleeve nut 34. A spiral spring 44, surrounds the stem of pintle 36 and one end of the compression spring bears against the inner shoulder of flange 37 while the other end bears against the inner end of sleeve nut 34. The functions of reduced portion 13 are to cooperate with engaging projection 39 to limit the relative travel between the anvil sleeve and the projection and to hold the anvil sleeve assembled to the projection and prevent it from sliding off. The length of reduced portion 13 of projection 12 is made sufficient to permit the anvil sleeve to receive the impacts of the hammer and translate the impacts directly to the head of the stake without any of the impact being transmitted through or to projection 12 or to the attached level rod 10.

A hammer means 45 comprises a head 46 and a handle 47. The hammer head and handle are preferably axially aligned and the hammer means is provided with an axial hole or passageway 48 that is slightly larger in transverse cross sectional area than the level rod proper and corresponds to the cross sectional outline of the level rod. The upper end of handle 47 may be knurled to insure an easy grip. The head of the hammer is preferably made to conform to the striking surface of the anvil portion of the anvil sleeve. FIGURE 6 shows hammer means 45 provided with one form of locking means adapted to secure the hammer means to end portion 49 of the level rod proper, when locked in position hammer means 45 and projection 12 will coact as a single unit if used in driving metal pins, as described hereafter, and the weight of the hammer means will add its mass to the force striking the head of the metal pin.

In FIGURE 6 hammer head 46 is provided with a radial bore 50 having a threaded outer portion 51 adapted to receive a threaded sleeve nut 52. Pintle 53 is provided with a flange 54 at one end that is adapted to snugly slide in bore 50. An engaging pin 55, corresponding to the proportions of a shallow radial bore 56, preferably located in the lower end portion 49 of the level rod, extends a short distance from the surface of flange 54. The opposite end of pintle 53 is fitted with a head 57 having a pair of diametrically opposed ears 58 adapted to seat in corresponding slots 59 diametrically positioned in the head of sleeve nut 52. A compression spring 60 exerts pressure between the inner end of sleeve nut 52 and the inner surface of flange 54, and forces pin 55 into bore 56 whenever the hammer is placed in registering position and notches 59 are seated by ears 58.

The manner in which the device operates is as follows: projection 12 of the level rod is inserted into passageway 48 of the hammer means and the head and handle of the hammer means are slipped over as shown in FIG. 6. Projection 12 is then inserted into axial passageway of the anvil sleeve 19 as shown in FIG. 3 and engaging-disengaging means 41 is released to permit it to engage reduced portion 13. Stake holder sleeve 25 is next mounted on anvil sleeve 19 and stop means 23 is secured to the anvil sleeve. The operator inserts a stake 17 into the stake holder sleeve and is held in place by concave portion 31 of the spring. The level rod and assembly is raised to a vertical position, in this position, the lower zero end 14 of projection 12 will rest on upper surface 18 of stake 17 and at the same time lower end 22 of the anvil sleeve will also be resting against the surface 18. The pointed end of stake 17 is placed on the ground and the lower end, the open end, of stake holder sleeve 25 will also be resting on the ground or above the ground depending on the length of the stake. To drive the stake into the ground, the rodman raises the hammer assembly, with locking pin 55 retracted, by its handle 47 to the proper height and then allows head 46 to fall sharply against anvil 21. The impact is transmitted by end 22 of anvil sleeve 19 to stake 17 and the stake will be driven accordingly into the ground without transmitting any of the impact to projection 12 or level rod 10. End 14 of projection 12 will remain in contact with the end of stake 17 and the elevation can be read by the levelman. The above striking operation is repeated until the stake has been driven to the correct elevation, the apparatus is lifted and the stake is released from the stake holder sleeve. The operator now inserts a new stake and is ready to set the stake at a required location.

If the stake is to be driven below the surface of the ground, stake holder sleeve 25 will come in contact with the surface of the ground long before the end of the stake is flush with the ground. In this position the stake holder sleeve will prevent dirt and loose material from falling on the end of the stake and even after the head of the stake is below the surface it will prevent any dirt or other loose material from falling into the hole while the impact end 22 of anvil sleeve 19 and end 14 of projection 12 follow the head of stake 17 to its correct elevation below the surface.

My level rod and stake driving combination may also be used to drive so-called metal pins or spikes into the ground where it is desirable to use this form of marker. The method of driving pins by my novel combination is illustrated in FIGURE 7. Since stake holder sleeve 25 is not required to support the pin it may be removed or it may be pushed up on the anvil sleeve 19 until it is out of the way; spring 30 will hold stake holder sleeve 25 when it is in raised position. A metal pin 61 having a head adapted to slide into the longitudinal passageway of anvil sleeve 19, is inserted therein. Engagement member 39 of the engaging-disengaging means is preferably located near the midportion of reduced portion 13 while end 14 of the projection rests against the head of pin 61. Hammer means 45 is likewise not required to supply impacts for this operation since the only slight impact is necessary and is imparted to the head of the pin through end 14 of projection 12. The hammer means, if it is on the level rod, is placed in locked position on the lower end of the level rod, the weight of the hammer serves to increase the weight of the level rod that is bearing on end 14 of projection 12. The level rod, hammer means, and projection 14 are raised a short distance so that end 14 is above the head of pin 61 and end 14 will strike the pin when it is left free to fall. The axial passageway of the anvil sleeve holds the pin in vertical position and guides it until it is secure in the ground when the head of the pin may be driven to the desired level by repeated impacts transmitted through the end 14 of the projection.

While the invention has been described in detail with respect to the illustrative examples and embodiments of the invention, it is to be understood that various changes and modifications may be made without departing from the spirit of the invention or the scope thereof, and it is intended therefore to cover all such changes and modifications in the appended claims.

I claim:

1. A level rod and stake driving combination comprising; a level rod with indicia; a projection extending from the low numbered end of said level rod, the end of said projection being positioned to correspond to the zero point of said indicia and adapted to contact the planar end of a stake; an anvil sleeve comprising an anvil portion and a sleeve portion, said anvil sleeve being provided with a longitudinal passageway adapted to slidably receive said projection, the anvil portion of said anvil sleeve being located at the end of said sleeve nearest the level rod, the opposite end of said sleeve being adapted to contact the planar end of a stake; and hammer means, said hammer means being provided with a longitudinal passageway adapted to permit the hammer means to slide up and down on said level rod, the striking end of the hammer means being adapted to contact the anvil of said anvil sleeve.

2. A level rod and stake driving combination comprising: a level rod with indicia; a projection extending from the low numbered end of the level rod, the end of said projection being positioned to correspond to the zero point of said indicia and also being adapted to contact the planar end of a stake; an anvil sleeve comprising a sleeve portion and an anvil portion, said anvil sleeve being provided with a longitudinal passageway adapted to slidably receive said projection, the anvil portion of said anvil sleeve being located at the end of said sleeve portion nearest the level rod, the opposite end of said sleeve being adapted to contact the planar end of a stake; hammer means, said hammer means being provided with a longitudinal passageway adapted to permit said hammer means to slide up and down on said level rod, the striking end of said hammer means being adapted to contact the anvil; and a stake holder sleeve having an open end leading to a chamber adapted to receive a stake, the other end of said stake holder sleeve being closed and provided with a passageway adapted to slidably receive the sleeve portion of said anvil sleeve.

3. A level rod and stake driving combination comprising: a level rod with indicia; a projection extending from the low numbered end of said level rod, the end of said projection being positioned to correspond with the zero point of said indicia and adapted to contact the planar end of a stake; a portion of said projection having a transverse cross section that is smaller than the transverse cross section of the remainder of said projection, said portion of reduced cross section extending longitudinally a substantial distance along said projection, the end of said portion of reduced cross section nearest the level rod being in spaced relationship therewith; an anvil sleeve comprising a sleeve portion and an anvil portion, said anvil sleeve having a longitudinal passageway adapted to slidably receive said projection, the anvil portion of the anvil sleeve being adjacent the level rod; and means associated with said anvil sleeve adapted to slidably engage said portion of reduced cross section in said projection and permit relative movement between the zero end of the projection and said anvil sleeve a distance corresponding to the length of said portion of reduced cross section.

4. A level rod and stake driving combination comprising; a level rod with indicia; a projection extending from the low numbered end of said level rod, the end of said projection being positioned to correspond to the zero point of said indicia and adapted to contact the planar end of a stake; a portion of said projection having a transverse cross section that is smaller than the transverse cross section of the remainder of said projection, said portion of reduced cross section extending longitudinally a substantial distance along said projection, the end of said portion of reduced cross section nearest the level rod being in spaced relationship therewith; an anvil sleeve comprising a sleeve portion and an anvil portion; said anvil sleeve having a longitudinal passageway adapted to slidably receive said projection, the anvil portion of said anvil sleeve being at the end of said sleeve adjacent the level rod; means associated with said anvil sleeve adapted to slidably engage said portion of reduced cross section in the projection and permit relative movement between the zero end of the projection and said anvil sleeve a distance corresponding to the length of said portion of reduced cross section; and hammer means, said hammer means being provided with a longitudinal passageway adapted to permit said hammer means to slide up and down on said level rod, the head of said hammer means being adapted to contact the anvil of said anvil sleeve.

5. A level rod and stake driving combination comprising: a level rod with indicia; a projection extending from the low numbered end of said level rod, the end of said projection being positioned to correspond to the zero point of said indicia and adapted to contact the planar end of a stake; a portion of said projection having a transverse cross section that is smaller than the transverse cross section of the remainder of said projection, said portion of reduced cross section extending longitudinally a substantial distance along said projection, the end of said portion of reduced cross section nearest the level rod being in spaced relationship therewith; an anvil sleeve comprising a sleeve portion and an anvil portion, said anvil sleeve being provided with a longitudinal passageway adapted to slidably receive said projection, the anvil portion of said anvil sleeve being located at the end of the sleeve nearest said level rod; the opposite end of said sleeve being adapted to contact the planar end of a stake; means associated with said anvil sleeve adapted to slidably engage said portion of reduced cross section in the projection and permit relative movement between the zero end of said projection and said anvil sleeve a distance corresponding to the length of said portion of reduced cross section; hammer means, said hammer means being provided with a longitudinal passageway adapted to permit said hammer means to slide up and down on said level rod, the head of said hammer means being adapted to contact the anvil of said anvil sleeve; and a stake holder sleeve having an open end leading to a chamber adapted to receive a stake, the other end of said stake holder sleeve being closed and provided with an axial passageway adapted to slidably receive the sleeve portion of said anvil sleeve.

6. A level rod and stake driving combination according to claim 5 wherein said stake holder sleeve is provided with spring means associated with one wall thereof adapted to exert pressure on a stake inserted in said chamber to hold said stake within said stake holder sleeve and also to engage the sleeve portion of the anvil sleeve when said spring is in cooperating position with said sleeve portion.

7. A level rod and stake driving combination comprising a level rod with indicia; a projection extending from the low numbered end of said level rod, the end of said projection being positioned to correspond to the zero point of said indicia and adapted to contact the planar end of a stake; a portion of said projection having a transverse cross section that is smaller than the transverse cross section of the remainder of said projection, said portion of reduced cross section extending longitudinally a substantial distance along said projection, the end of said portion of reduced cross section nearest the level rod being in spaced relationship therewith; an anvil sleeve comprising a sleeve portion and an anvil portion, said anvil sleeve being provided with a longitudinal passageway adapted to slidably receive said projection, the anvil portion of said anvil sleeve being located at the end of the sleeve portion nearest the level rod, the opposite end of said sleeve portion being adapted to contact the planar end of a stake; means associated with said anvil sleeve adapted to slidably engage said portion of reduced cross section in the projection and permit relative movement between the zero end of said projection and said anvil sleeve a distance corresponding to the length of said portion of reduced cross section; hammer means, said hammer means being provided with a longitudinal passageway adapted to permit said hammer means to slide on said level rod, the head of said hammer means being adapted to contact the anvil of said anvil sleeve; means associated with said hammer means adapted to engage a registering orifice positioned at the lower end portion of said level rod to secure said hammer means and prevent it from sliding on said level rod.

8. A level rod and stake driving combination comprising: a level rod with indicia; a projection extending from the low numbered end of the level rod, the end of said projection being positioned to correspond to the zero point of the indicia and adapted to contact the planar end of a stake; a portion of said projection having a transverse cross section that is smaller than the transverse cross section of the remainder of said projection, said portion of reduced cross section extending longitudinally a substantial distance along said projection, the end of said portion of reduced cross section nearest the level rod being in spaced relationship therewith; an anvil sleeve comprising a sleeve portion and an anvil portion; said anvil sleeve being provided with a longitudinal passageway adapted to slidably receive said projection, the anvil portion being located at the end of said sleeve portion nearest the level rod, the opposite end of said sleeve portion being adapted to contact the planar end of a stake; means associated with said anvil sleeve adapted to slidably engage said portion of reduced cross section in the projection and permit relative movement between the zero end of said projection and said anvil sleeve for a distance corresponding to the length of said portion of reduced cross section; hammer means, said hammer means being provided with a longitudinal passageway adapted to permit said hammer means to slide along said level rod, the head of said hammer means being adapted to contact the anvil portion of said anvil sleeve; a stake holder sleeve having an open end leading to a chamber, the opening and chamber adapted to receive a stake, the opposite end of said stake holder sleeve being closed and having an axial passageway adapted to slidably receive the sleeve portion of said anvil sleeve; and removable stop means associated with the lower end of the sleeve portion of the anvil sleeve adapted to prevent the stake holder sleeve, when mounted on said anvil sleeve, from becoming separated from said anvil sleeve.

References Cited in the file of this patent

UNITED STATES PATENTS

| 1,246,070 | Duckworth | Nov. 13, 1917 |
| 2,855,601 | Hamlin | Oct. 14, 1958 |
| 2,867,041 | McMillan | Jan. 6, 1959 |